United States Patent
Lewis et al.

(10) Patent No.: US 11,247,542 B2
(45) Date of Patent: Feb. 15, 2022

(54) FOLDING SOFT TOP WITH LIFT ASSIST

(71) Applicant: Bestop, Inc., Louisville, CO (US)

(72) Inventors: Stephen J. Lewis, Harrison Township, MI (US); Tavis Lutzka, Rochester Hills, MI (US); William H. Haberkamp, Rochester Hills, MI (US); Eric D. Getzschman, New Baltimore, MI (US); Jose N. Vigil, Westminster, CO (US); Andy Waite, Aurora, CO (US)

(73) Assignee: Bestop, Inc., Louisville, CO (US)

( * ) Notice: Subject to any disclaimer, the term of this patent is extended or adjusted under 35 U.S.C. 154(b) by 156 days.

(21) Appl. No.: 16/567,728

(22) Filed: Sep. 11, 2019

(65) Prior Publication Data

US 2020/0001693 A1    Jan. 2, 2020

Related U.S. Application Data

(63) Continuation of application No. 15/918,587, filed on Mar. 12, 2018, now Pat. No. 10,449,843, which is a continuation-in-part of application No. 15/861,194, filed on Jan. 3, 2018, now Pat. No. 10,583,720, which is a continuation-in-part of application No.
(Continued)

(51) Int. Cl.
| | |
|---|---|
| *B60J 7/06* | (2006.01) |
| *B60J 7/04* | (2006.01) |
| *B60J 7/12* | (2006.01) |
| *B60J 7/043* | (2006.01) |

(52) U.S. Cl.
CPC ............ *B60J 7/061* (2013.01); *B60J 7/1226* (2013.01); *B60J 7/043* (2013.01)

(58) Field of Classification Search
CPC .......... B60J 7/1226; B60J 7/061; B60J 7/043
See application file for complete search history.

(56) References Cited

U.S. PATENT DOCUMENTS

| | | |
|---|---|---|
| 3,819,227 A | 6/1974 | Carli |
| 5,299,850 A | 4/1994 | Kaneko et al. |
| | (Continued) | |

FOREIGN PATENT DOCUMENTS

| | | |
|---|---|---|
| BE | 350963 A | 4/1928 |
| DE | 19544619 A1 | 6/1997 |
| | (Continued) | |

OTHER PUBLICATIONS

International Search Report for Application No. PCT/US2015/022716 dated Jun. 8, 2015.
(Continued)

*Primary Examiner* — D Glenn Dayoan
*Assistant Examiner* — Melissa Ann Bonifazi
(74) *Attorney, Agent, or Firm* — Warn Partners, P.C.

(57) ABSTRACT

A soft top assembly which includes lift assist and improved fabric management. The assembly includes front side rails pivotally connected to rear side rails. A plurality of fabric control bows with control linkages provide fabric control to the top material during pivoting of the front side rails. A first and second gas strut are attached to the rear side rails to assist lifting and controlled motion as the top is moved between a closed position and open sunroof position, as one strut is fully loaded and compressed while the other strut is fully loaded and open, for lift assist and dampening.

20 Claims, 14 Drawing Sheets

Related U.S. Application Data

15/790,836, filed on Oct. 23, 2017, now Pat. No. 10,603,994, which is a continuation-in-part of application No. 15/595,396, filed on May 15, 2017, now Pat. No. 10,414,253.

(60) Provisional application No. 62/469,934, filed on Mar. 10, 2017, provisional application No. 62/441,810, filed on Jan. 3, 2017, provisional application No. 62/411,249, filed on Oct. 21, 2016, provisional application No. 62/336,062, filed on May 13, 2016.

(56) References Cited

U.S. PATENT DOCUMENTS

| | | |
|---|---|---|
| 6,015,181 A | 1/2000 | Exner |
| 6,206,450 B1 | 3/2001 | Ide et al. |
| 6,409,247 B1 | 6/2002 | Maass |
| 6,827,391 B1 | 12/2004 | Kohn et al. |
| 6,886,881 B1 | 5/2005 | Henderson et al. |
| 8,845,005 B2 | 9/2014 | Huotari et al. |
| 9,238,400 B2 | 1/2016 | Hanson |
| 9,346,342 B1 | 5/2016 | Bowles |
| 9,776,488 B2 | 10/2017 | Bowles |
| 9,827,833 B2 | 11/2017 | Hanson |
| 2001/0030443 A1 | 10/2001 | Barker |
| 2004/0108747 A1 | 6/2004 | Obendiek |
| 2004/0130188 A1 | 7/2004 | Stevens et al. |
| 2005/0134096 A1 | 6/2005 | Fallis, III et al. |
| 2012/0098292 A1 | 4/2012 | Huotari et al. |
| 2012/0286540 A1 | 11/2012 | Moran et al. |
| 2014/0103682 A1 | 4/2014 | Lewis et al. |
| 2014/0138983 A1 | 5/2014 | Haberkamp et al. |
| 2014/0300143 A1 | 10/2014 | Haberkamp et al. |
| 2015/0115646 A1 | 4/2015 | Bowles et al. |
| 2015/0123422 A1 | 5/2015 | Bennett et al. |
| 2015/0246605 A1 | 9/2015 | Kleinhoffer et al. |
| 2015/0352937 A1 | 12/2015 | Haberkamp et al. |
| 2016/0236556 A1 | 8/2016 | Smith et al. |

FOREIGN PATENT DOCUMENTS

| | | |
|---|---|---|
| DE | 29715809 U1 | 10/1997 |
| DE | 19927234 C1 | 7/2000 |
| DE | 10102643 A1 | 7/2002 |
| DE | 202011105496 U1 | 1/2012 |
| EP | 1634748 A2 | 3/2006 |
| FR | 2745778 A1 | 9/1997 |
| FR | 2937591 A1 | 4/2010 |
| FR | 2943281 A1 | 9/2010 |
| GB | 296586 A | 9/1928 |
| GB | 311081 A | 5/1929 |
| GB | 312485 A | 5/1929 |
| GB | 336514 A | 10/1930 |
| GB | 946781 A | 1/1964 |
| WO | 0132455 A2 | 5/2001 |
| WO | 2004056596 A2 | 7/2004 |

OTHER PUBLICATIONS

International Search Report for Application No. PCT/US2017/032715 dated Aug. 16, 2017.

International Search Report for Application No. PCT/US2011/001816 dated Feb. 17, 2012.

Extended European Search Report for Application No. EP 16 18 5007 dated Dec. 19, 2016.

Extended European Search Report for Application No. EP 17 19 4977 dated Feb. 27, 2018.

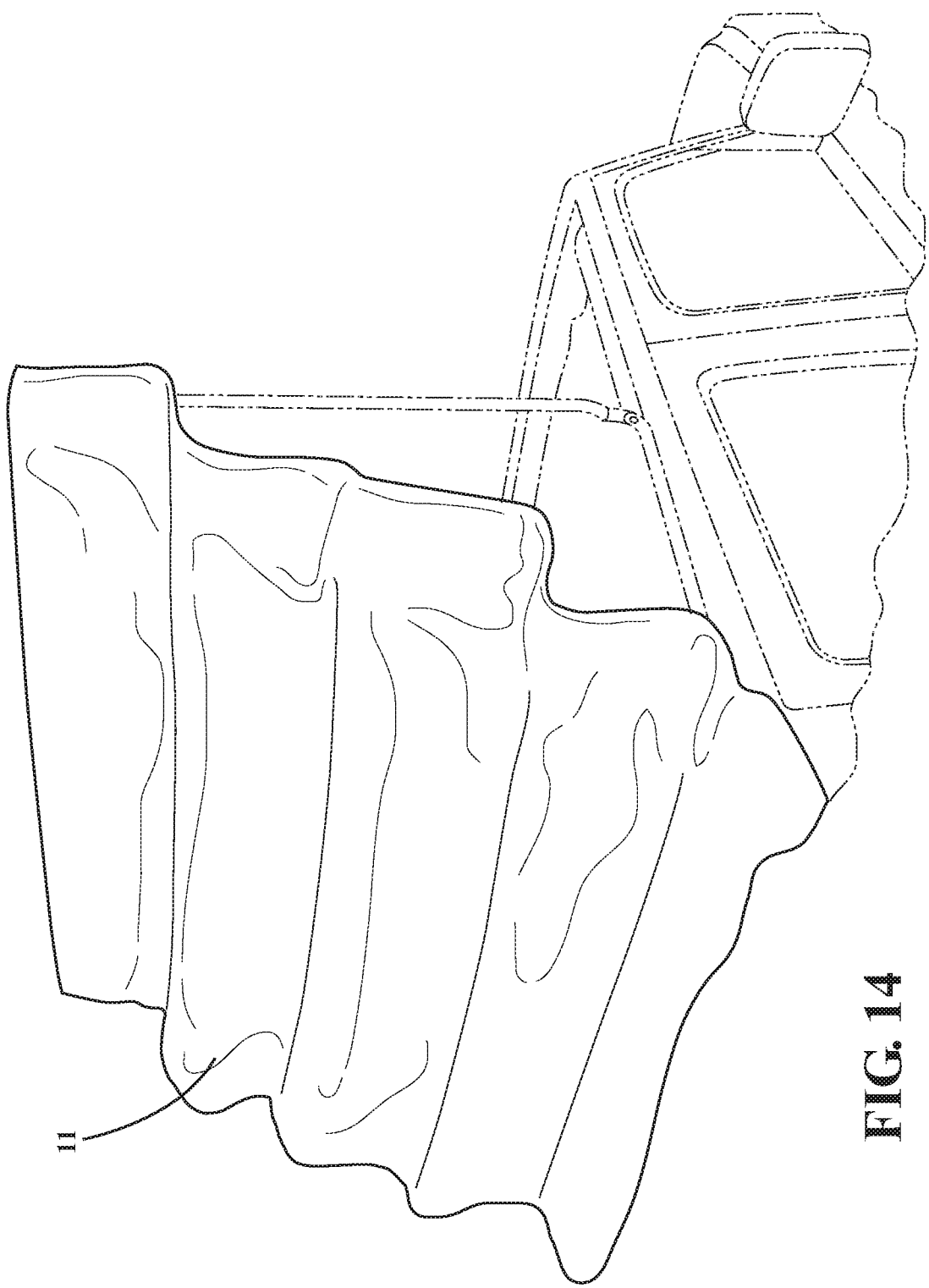

FOLDING SOFT TOP WITH LIFT ASSIST

CROSS-REFERENCE TO RELATED APPLICATIONS

The instant application is a continuation of U.S. patent application Ser. No. 15/918,587, filed Mar. 12, 2018, which is a non-provisional of U.S. Provisional Application No. 62/469,934, filed Mar. 10, 2017, and claims the benefit of U.S. Provisional Application No. 62/469,934, filed Mar. 10, 2017, and which is a continuation-in-part of U.S. patent application Ser. No. 15/861,194, filed Jan. 3, 2018, which is a continuation-in-part of U.S. patent application Ser. No. 15/790,836, filed Oct. 23, 2017, which is a continuation-in-part of U.S. patent application Ser. No. 15/595,396, filed May 15, 2017, which claims the benefit of U.S. Provisional Application No. 62/336,062, filed May 13, 2016, and which also claims the benefit of U.S. Provisional Patent Application No. 62/411,249, filed Oct. 21, 2016, and said U.S. patent application Ser. No. 15/861,194, filed Jan. 3, 2018 also claims the benefit of U.S. Provisional Patent Application No. 62/441,810, filed Jan. 3, 2017. The disclosures of the above applications are incorporated herein by reference.

FIELD OF THE INVENTION

The present invention relates to a folding sunroof for a soft top of a vehicle.

BACKGROUND OF THE INVENTION

Foldable soft tops for SUV vehicles are known in the art. These tops provide a vehicle with an open air experience with the top folded back or provide protection from the elements with the top folded forward. Such tops are typically manually retractable and during retraction the operator has to perform a series of manipulation of the top. Additionally, manual management and stowage of the fabric materials of the top during folding must be accomplished.

Thus, in order for a vehicle operator to facilitate opening of the soft top in order to provide the open air vehicle feeling the operator must be outside the vehicle to manipulate the soft top. Therefore, in recent years a soft top "sunroof" has become a well-received option for folding SUV soft tops. This "sunroof" typically folds back from within the vehicle such that the operator can readily provide an open air experience without folding back the entire soft top. An example of such a soft top is a soft top by Bestop, the assignee herein which provides a front "sunroof" portion of the top which folds back for revealing an open air sunroof feeling for the vehicle.

While this sunroof option has become a very desirable feature, it does require considerable force at the start of the deployment due to the operator's angle of attack. The mass of the frame mechanism for folding the top cover fabric and fabric becoming trapped in the frame mechanism linkage are additional concerns. Also, fabric management is occasionally problematic in that the fabric can become entangled or interfere with the frame mechanism of the top.

Therefore, there remains a need in the art to provide a sunroof deployment mechanism that provides easier opening and improved fabric management.

SUMMARY OF THE INVENTION

In accordance with the present invention, there is provided a soft top assembly which includes lift assist and improved fabric management. The assembly includes a pair of front side arms pivotally attached to rear side rails. The rear side rails are attached to the vehicle roll bar, preferably via rear door rails. A plurality of control bows are operably connected to provide fabric control to the top material during pivoting of the front side rails. Intermediate bows are provided with control linkages which provide management of the fabric thereby keeping the fabric out of the mechanism during opening and closing of the sunroof. A pair of the bow pivot links being pivotally connected to the rear side rail. A rear gas strut and a front gas strut are attached longitudinally to control linkages. One is closed and preloaded when the sunroof is in its closed position and upon opening the sunroof the preloaded strut provides lift assistance at the start of the pivotal opening of the sunroof the other of the struts gets loaded as the top is deployed and buffers the closing of the roof which also loads the strut to provide assistance in the closing direction when it is time to close the sunroof.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 14 is perspective view of the soft top assembly illustrating fabric management of a cover, in accordance with the present invention.

DETAILED DESCRIPTION OF THE PREFERRED EMBODIMENTS

Figure 1:
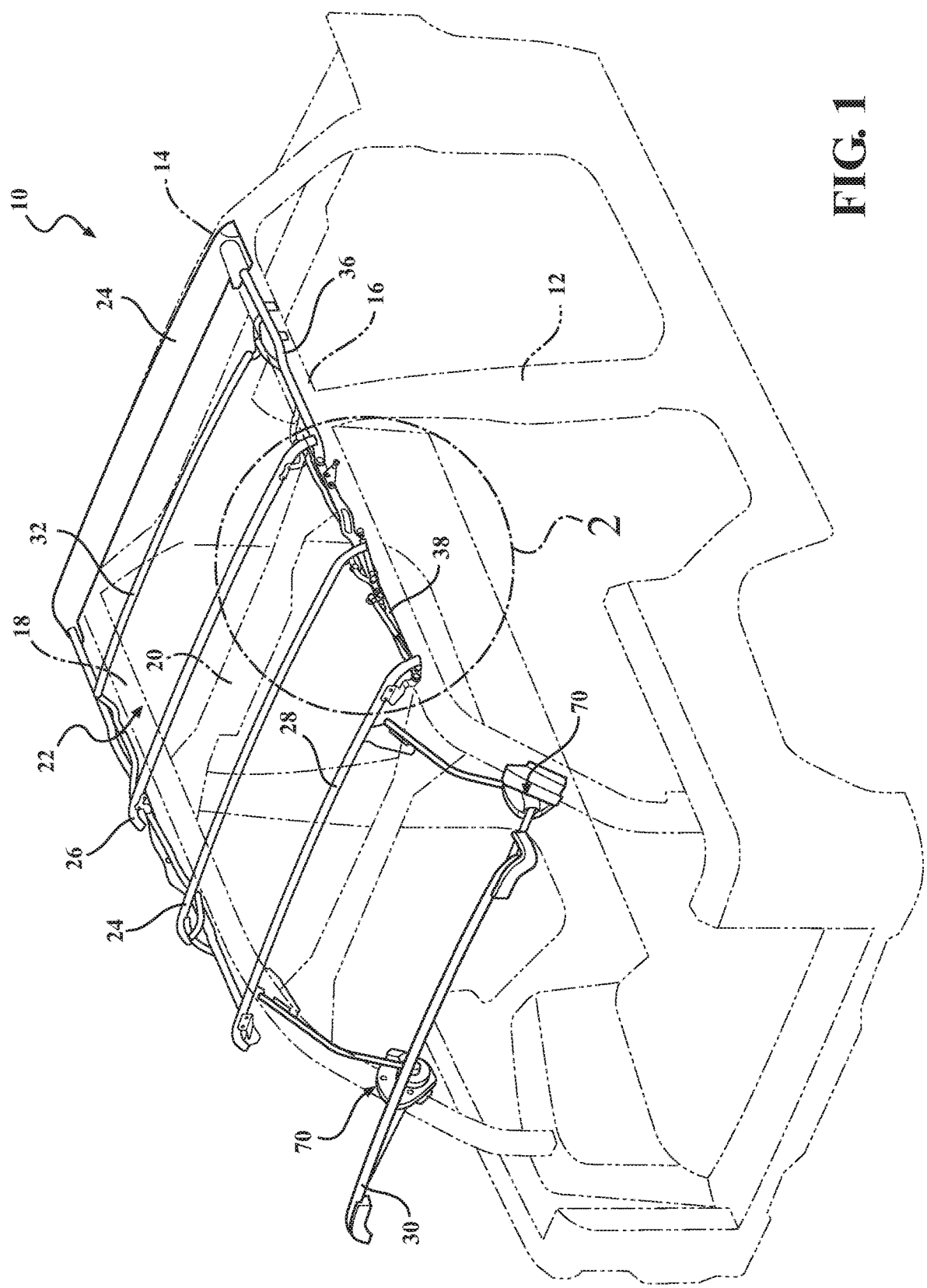
FIG. 1 is a perspective view of the soft top assembly, in a closed position, in accordance with the present invention.

The following description of the preferred embodiment(s) is merely exemplary in nature and is in no way intended to limit the invention, its application, or uses.

Referring to FIGS. 1-14 generally, in accordance with the present invention, there is provided a soft top assembly generally shown at 10 for a vehicle 12. The vehicle 12 includes a windshield header 14 with side members 16, 18, e.g., vehicle roll bar or sport bars, extending generally therefrom and at least one cross member 20 connecting the side members 16, 18 substantially adjacent the rear of the front cockpit compartment indicated generally at 22.

The assembly 10 generally includes a plurality of side rails, a plurality of bows, a plurality of linkages, at least one lift assist mechanism and at least one cover 11. The assembly 10 has a pivotal portion shown generally at 62 including a lift assist assembly shown generally at 63. The assembly 10 is operable to move the pivotal portion 62 between a closed position (to close the roof top opening of the vehicle) and an open position or "open sunroof" position (which uncovers at least the front cockpit 22 of the vehicle). Typically, the assembly 10 is further moveable between the open position and at least one top down position (which further uncovers the roof opening to create an open air experience for the rear passenger compartment) or open/stowed position. A fully stowed position where the top is retracted and collapsed against the rear cargo bed of the vehicle is also contemplated depending on the application without departure from the scope of the present invention. The present invention has additional bows, e.g., fabric management bows, with control linkages. The present invention also has a rear side rail with gas cylinders and control linkages to assist with lifting and controlling motion of the side rail assembly.

The plurality of bows of the assembly 10 includes at least a first bow 24 (selectively attachable to the windshield frame 14 are, e.g., via header latches to footman loops on the vehicle), a second bow 26, a third bow 28, a fourth bow 30 (rear bow), a first intermediate bow 32 (located between the first and second bows 24,26), and a second intermediate bow 34 (located between the second and third bows 26,28). More or less bows are contemplated depending on the application without departure from the scope of the present invention. Most preferably, at least the first and second intermediate bows 32,34 are fabric management bows. Preferably, the fabric management bows manage fabric of the soft top material cover during movement of the cover between the closed and open positions. The fabric management bows also minimize fabric movement when the soft panel top assembly is in the closed position, minimizes fabric movement in the closed position to cut down on noise, and manages fabric during operation between positions.

The assembly 10 includes at least one side rail. Most preferably, a side rail 36 (preferably, that is a front side rail) pivotally connected to a second side rail 38 (preferably, a rear side rail), on both sides of the vehicle 12. More or less side rails are contemplated depending on the application without departure from the scope of the present invention.

The plurality of linkages of the assembly 10 includes a second bow pivot link 44 (connected to the front side rail 36), a second intermediate bow control link 46 (connected to the pivot link 44 and the rear side rail 38), and a second intermediate bow pivot link 48 (operably connected to the second intermediate bow 34 and rear side rail 38). Another assist linkage 50 is also connected to the second intermediate bow pivot link 48 and the second intermediate bow control link 46.

Preferably, the first intermediate bow assembly 82 includes first and second control links 86,88 connected to the first intermediate bow 32. The first control link 86 is also connected to the first side rail 36. Preferably, the second intermediate bow assembly 34 is connected to the assist linkage 50 and second intermediate bow pivot link 48.

The lift assist mechanism 63 includes a first gas strut 52 and a second gas strut 54, e.g., first and second gas cylinders, preferably, including actuation shafts 52a and 54b, respectively, received in first and second compressed air assist pneumatic cylinder bodies, cylinders 52b and 54b, respectively. Preferably, the first and second gas struts 52 and 54 are operably connected in force opposition generally between the intermediate bow pivot link 48 and the second side rail 38 such that when one is compressed when the pivotal portion 62 is closed the other is extended, and vice versa. At least one first idler link 56 is connected to the first gas strut 52 and the rear side rail 38. At least one second idler link 58 is connected to the second gas strut 54 and the second intermediate bow pivot link 48. At least one idler link stop 60 is operably connected on the second intermediate bow pivot link 48.

Figure 2:
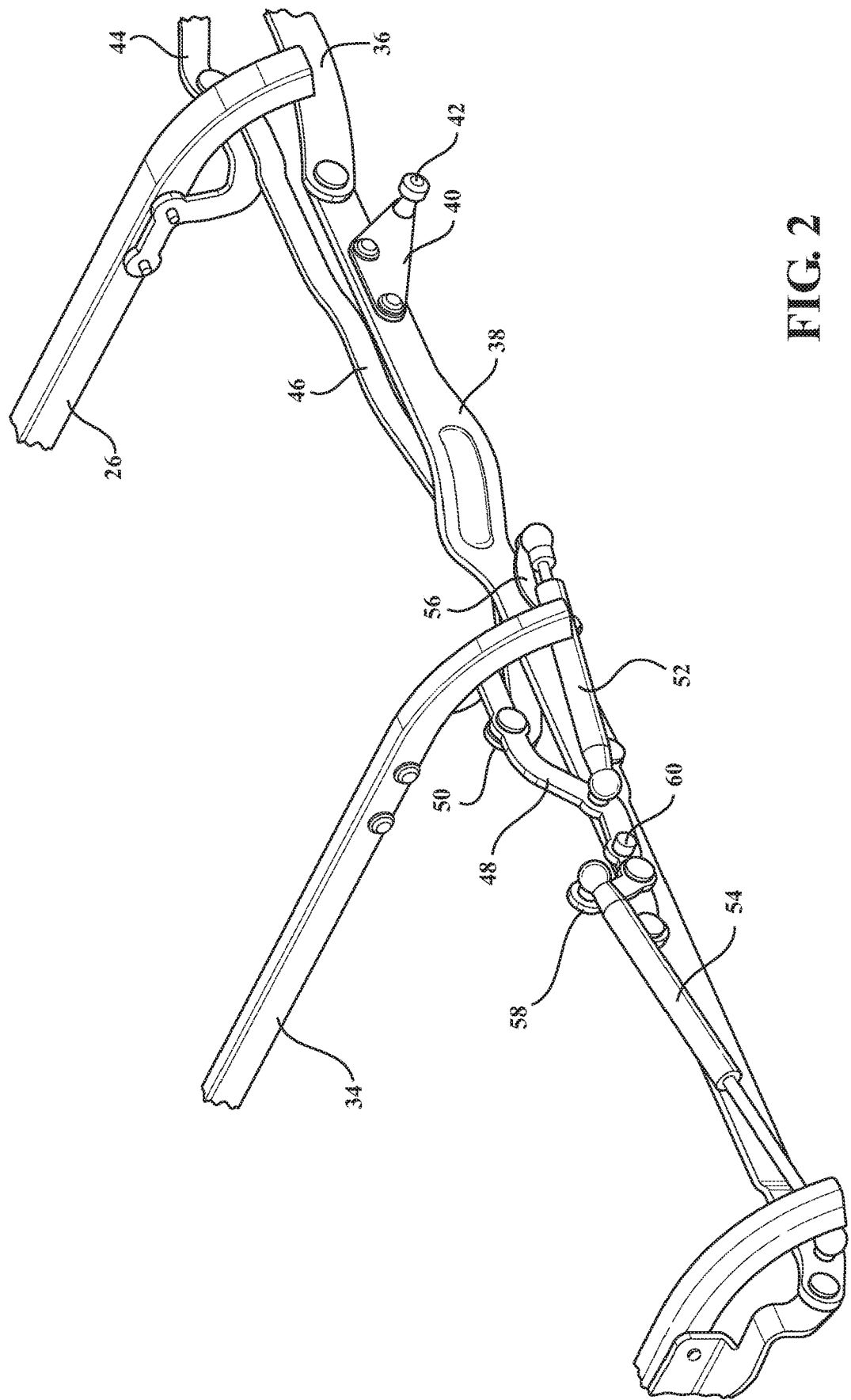
FIG. 2 is an enlarged perspective view of circle '2' of FIG. 1 depicting an assist mechanism of the soft top assembly in the closed position, in accordance with the present invention.

In the top closed position, the first gas strut 52 is fully loaded, compressed, and, the second gas strut 54 is fully unloaded, open (see FIG. 2).

Figure 3:
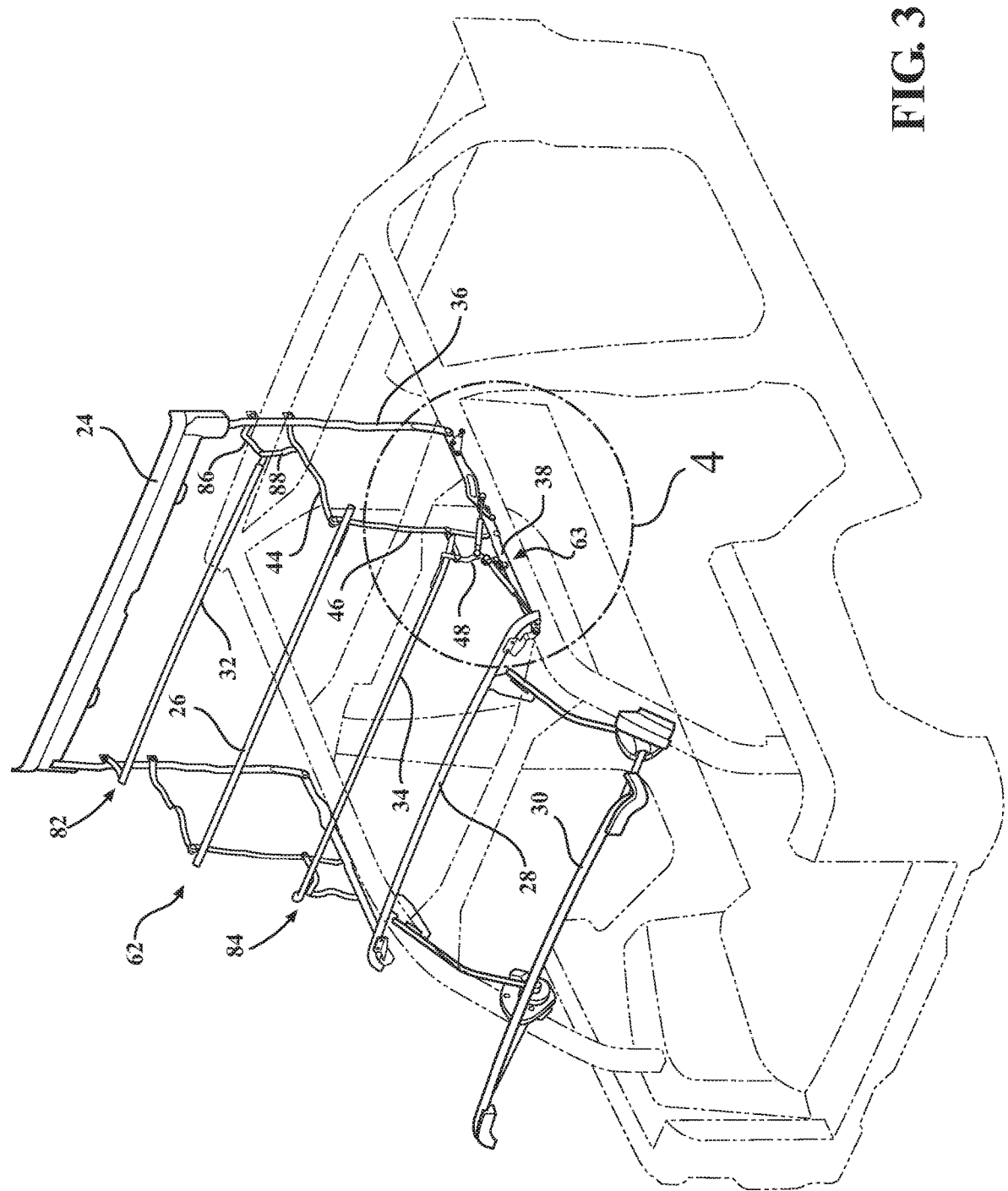
FIG. 3 is a perspective view of the soft top assembly of the present invention with a pivotal portion rotating to an open sunroof position, in accordance with the present invention.

The front side rail 36 is part of a pivotal portion shown generally at 62 (e.g., see FIG. 3). The assembly 10 is unlatched from the windshield header 14 at the first bow 24. The pivotal portion 62 is then lifted and rotated rearward. The top cover management is controlled by first and second intermediate bow shown generally at 82 and 84, including first and second intermediate bows 32 and. The pivotal portion 62 continues to rotate until the mechanism is in the open sunroof position (e.g., FIG. 7).

Figure 4:
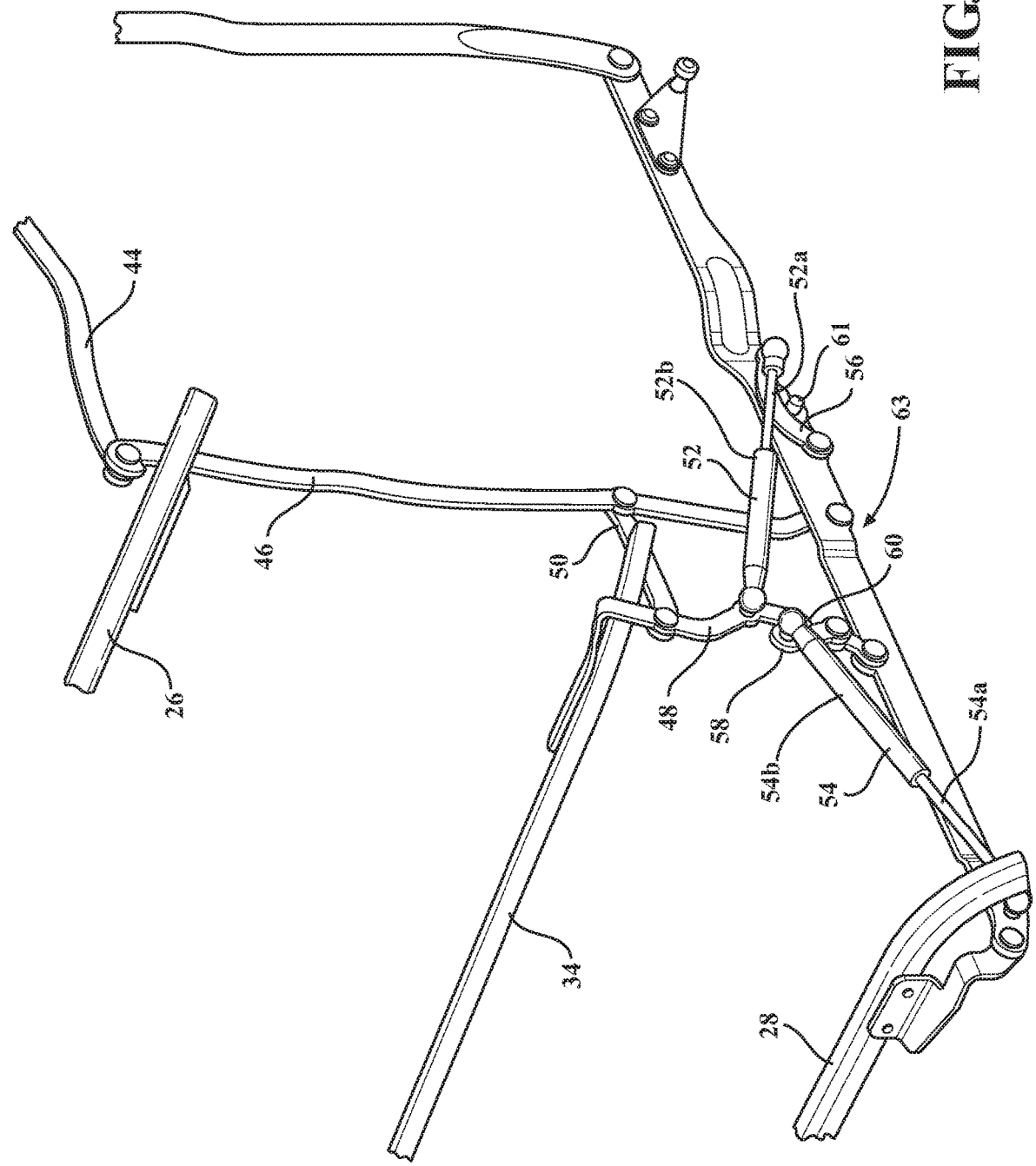
FIG. 4 is an enlarged perspective view of circle '4' of FIG. 3, in accordance with the present invention.
Figure 5:
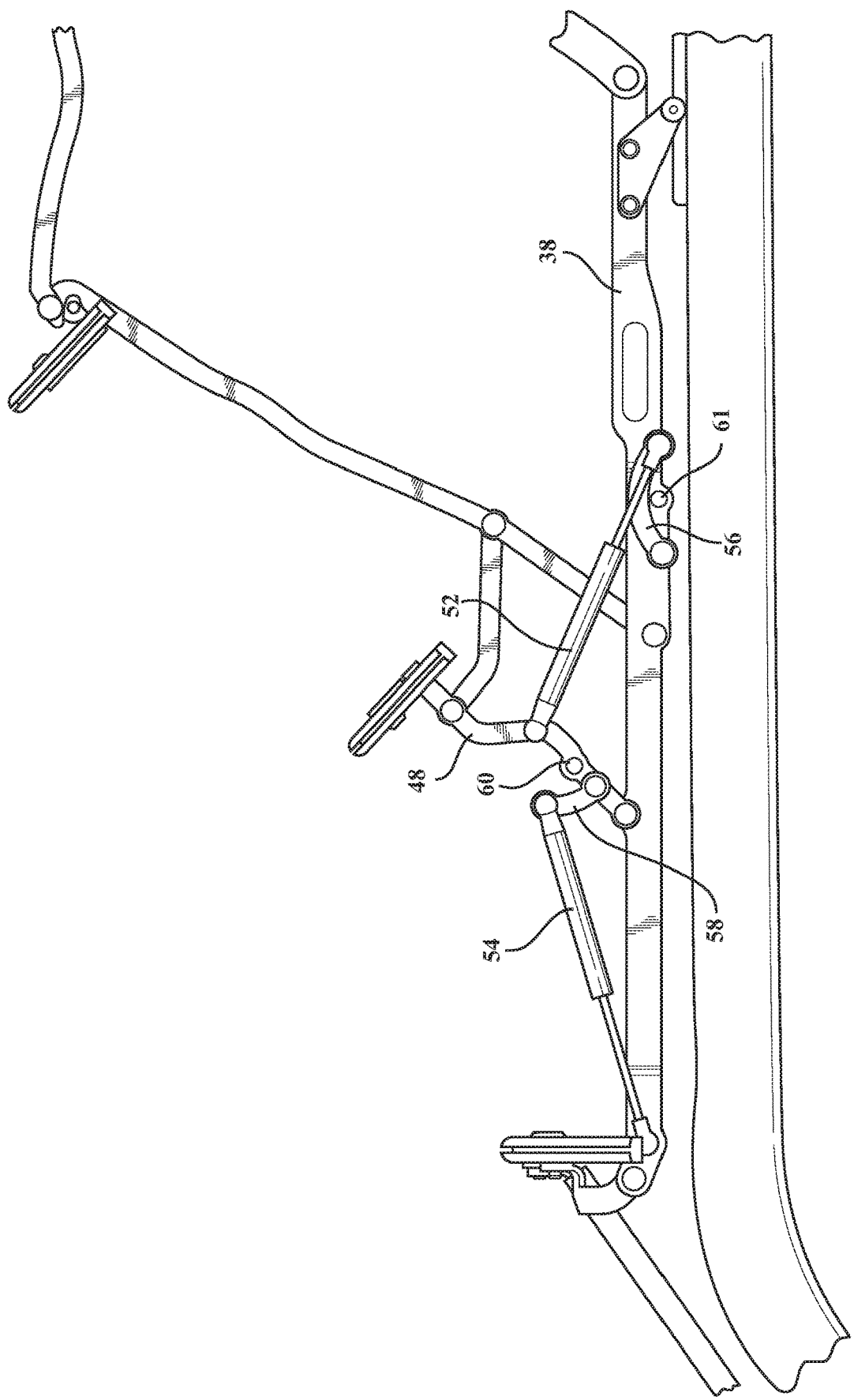
FIG. 5 is a side elevation view of the soft top assembly depicted in FIG. 4, in accordance with the present invention.

Referring more particularly to FIGS. 4 and 5, as the pivotal portion 62 is opened by lifting the first side bow 36, the first gas strut 52 cylinder unloads. In doing so the cylinder applies its load through the top mechanism linkages, thereby reducing the amount of effort required to operate the top. The second gas strut 54 cylinder remains fully unloaded as it is free to rotate via the idler link 58 attached to the second intermediate bow pivot link 48 (about the pivot joint 64).

Figure 6:
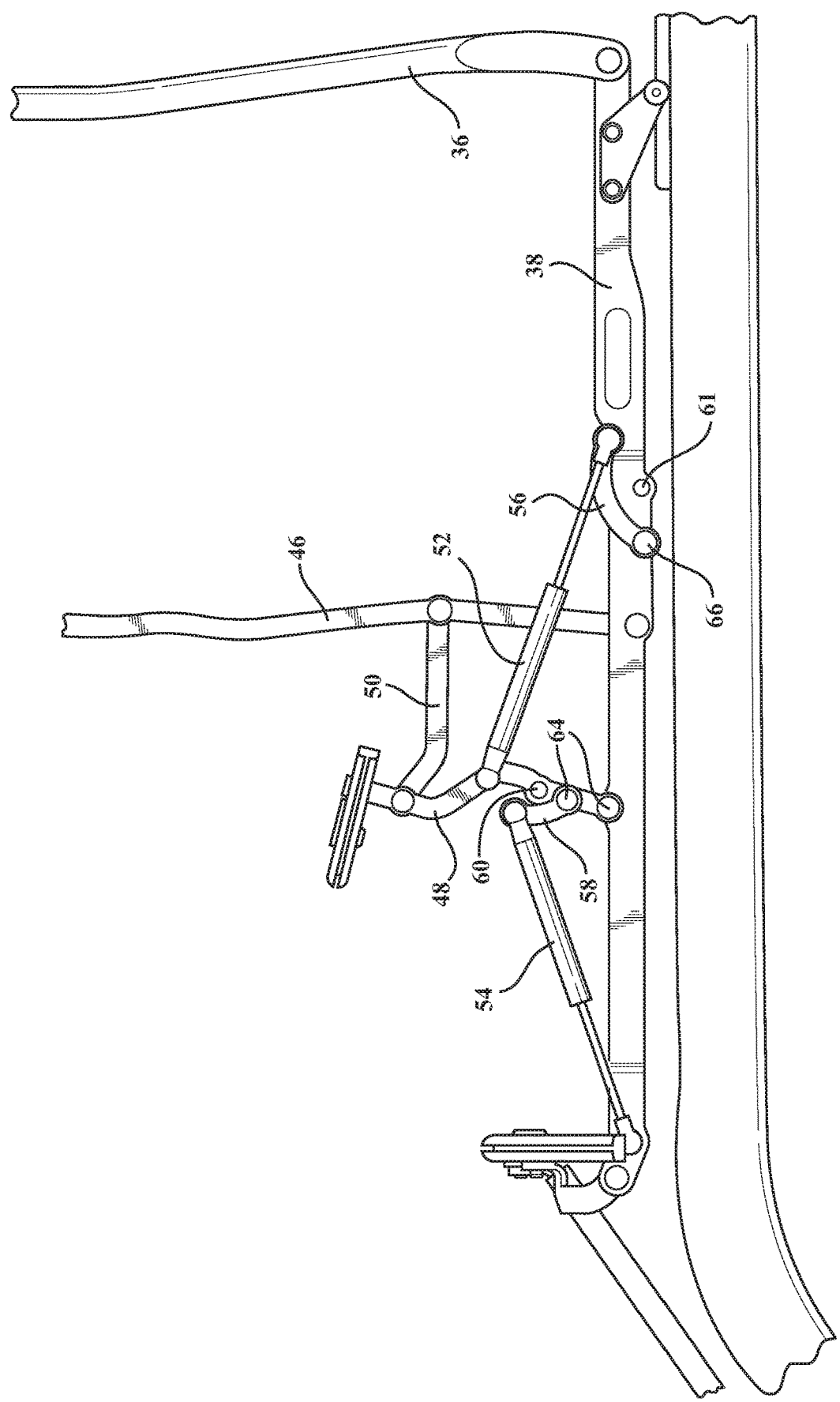
FIG. 6 is a side elevation view of the soft top assembly of FIG. 5 depicting further rearward rotation of the pivotal portion, in accordance with the present invention.

Referring more particularly to FIG. 6, by continuing the motion in opening the top (rotating the pivotal portion 62 further rearward), the idler link stop 60 attached to the second intermediate bow link 48 then makes contact with the second gas strut idler link 58. After making this contact, as the motion continues, it loads up the second gas strut 54. This loading dampens the effect of the top mass as the pivotal portion 62 moves down into the sunroof position. At the same time, first gas strut 52, when fully unloaded, is free to rotate about a pivot joint 66 on the first idler link 56 that is attached to the rear side rail 38.

Figure 7:
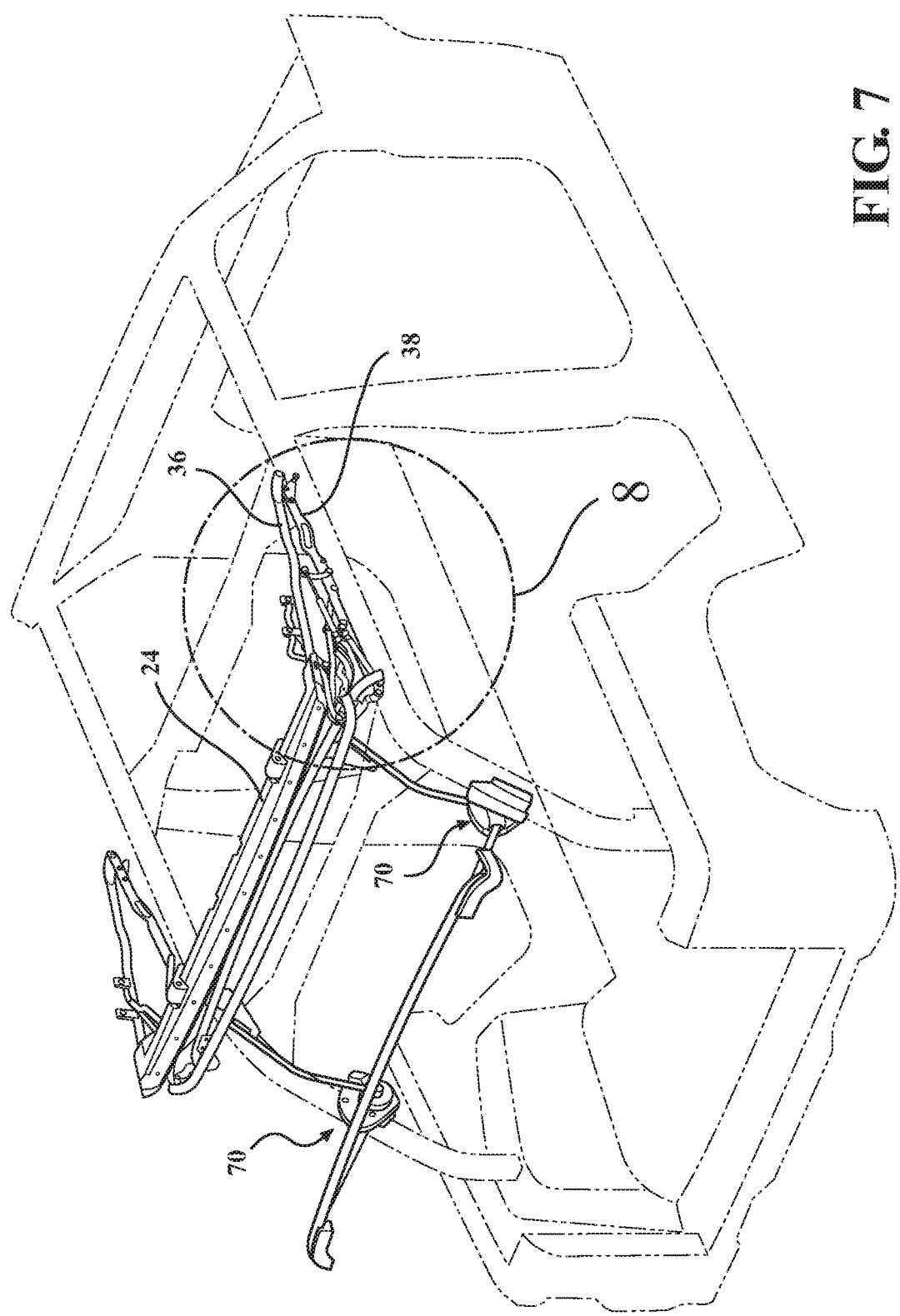
FIG. 7 is a perspective view of the pivotal portion in the open sunroof position, in accordance with the present invention.
Figure 8:
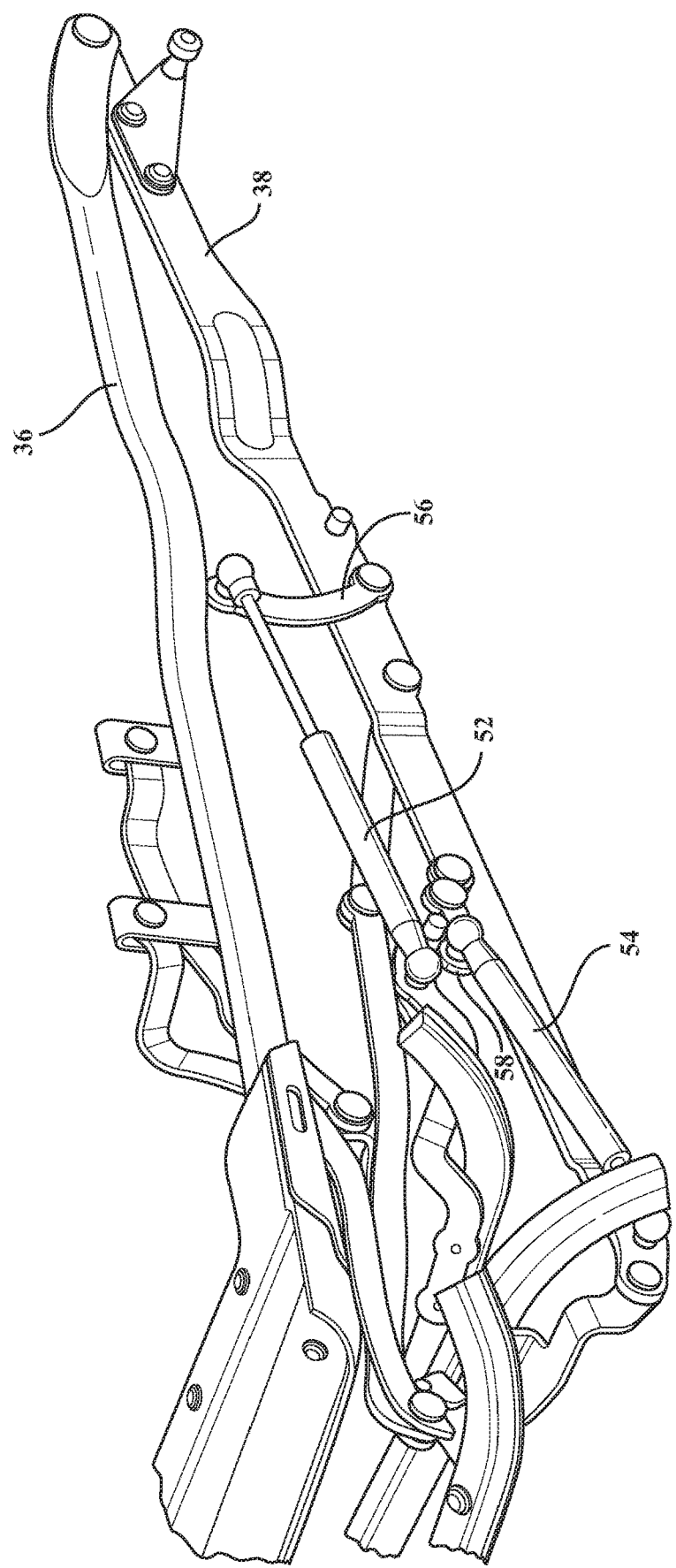
FIG. 8 is an enlarged perspective view of circle '8' of FIG. 7, in accordance with the present invention.
Figure 9:
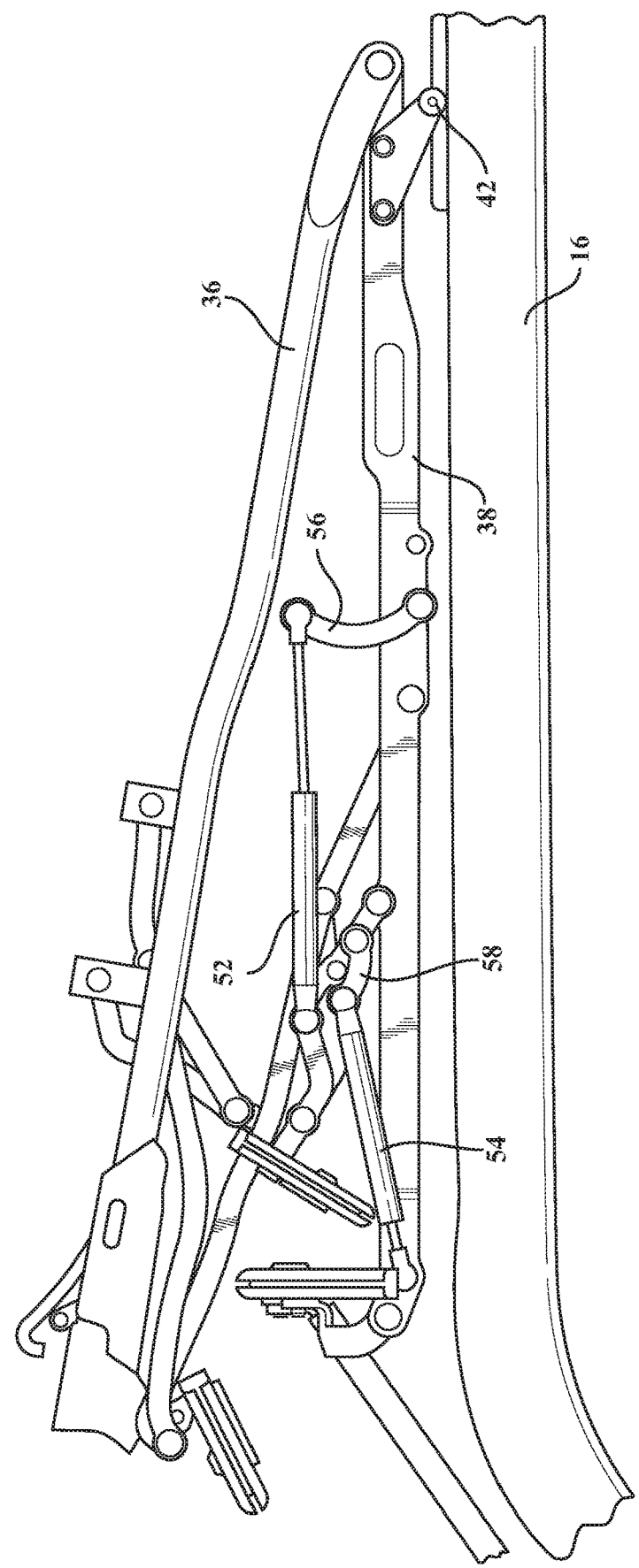
FIG. 9 is a side elevation view of FIG. 8, in accordance with the present invention.

Referring more particularly to FIGS. 7 to 9, when in the open sunroof position, the first gas strut 52 is fully unloaded, open. The second gas strut 54 is fully loaded, compressed.

Figure 10:
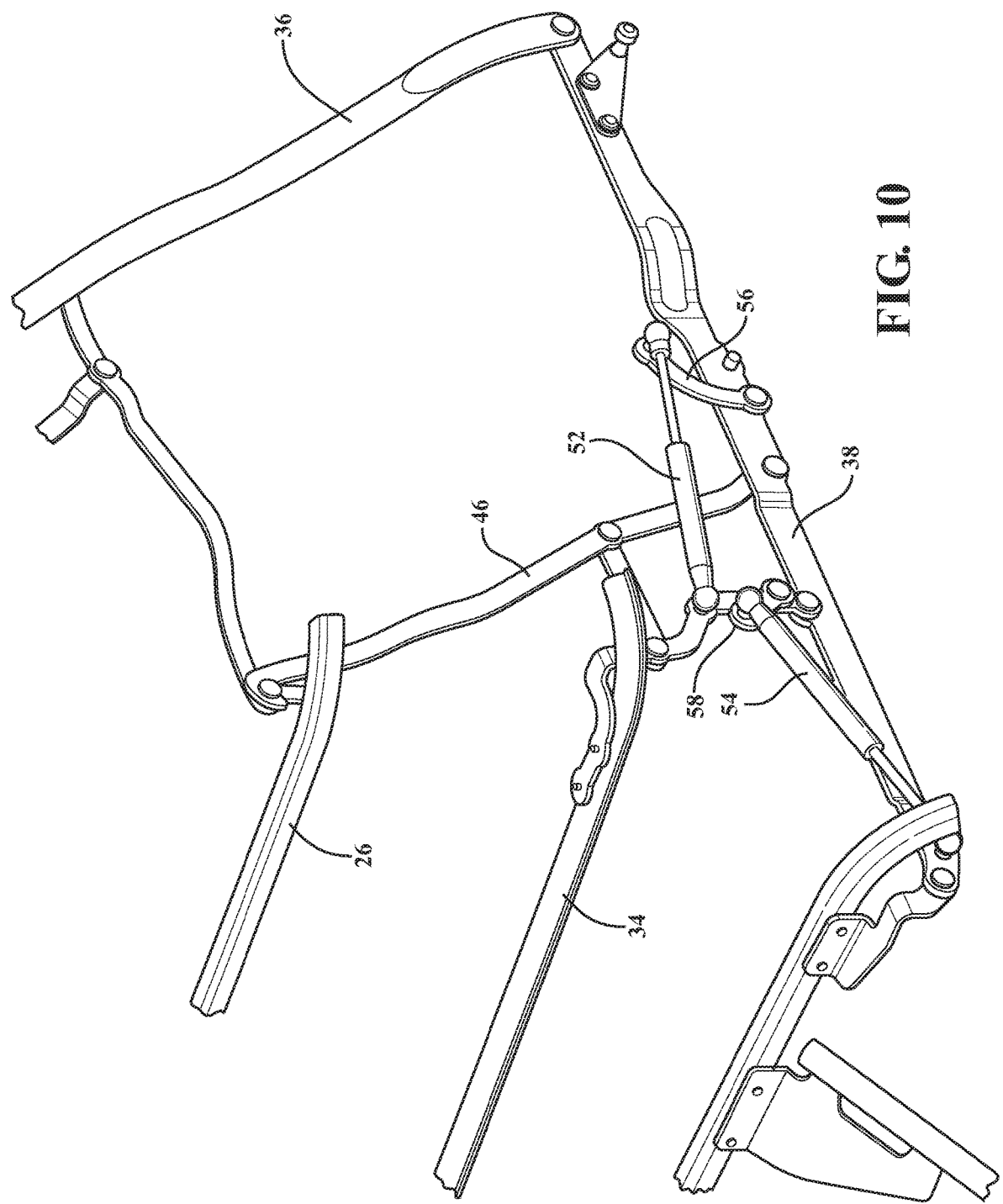
FIG. 10 is a perspective view of the pivotal portion during forward rotation from the open sunroof position toward the closed position, in accordance with the present invention.
Figure 11:
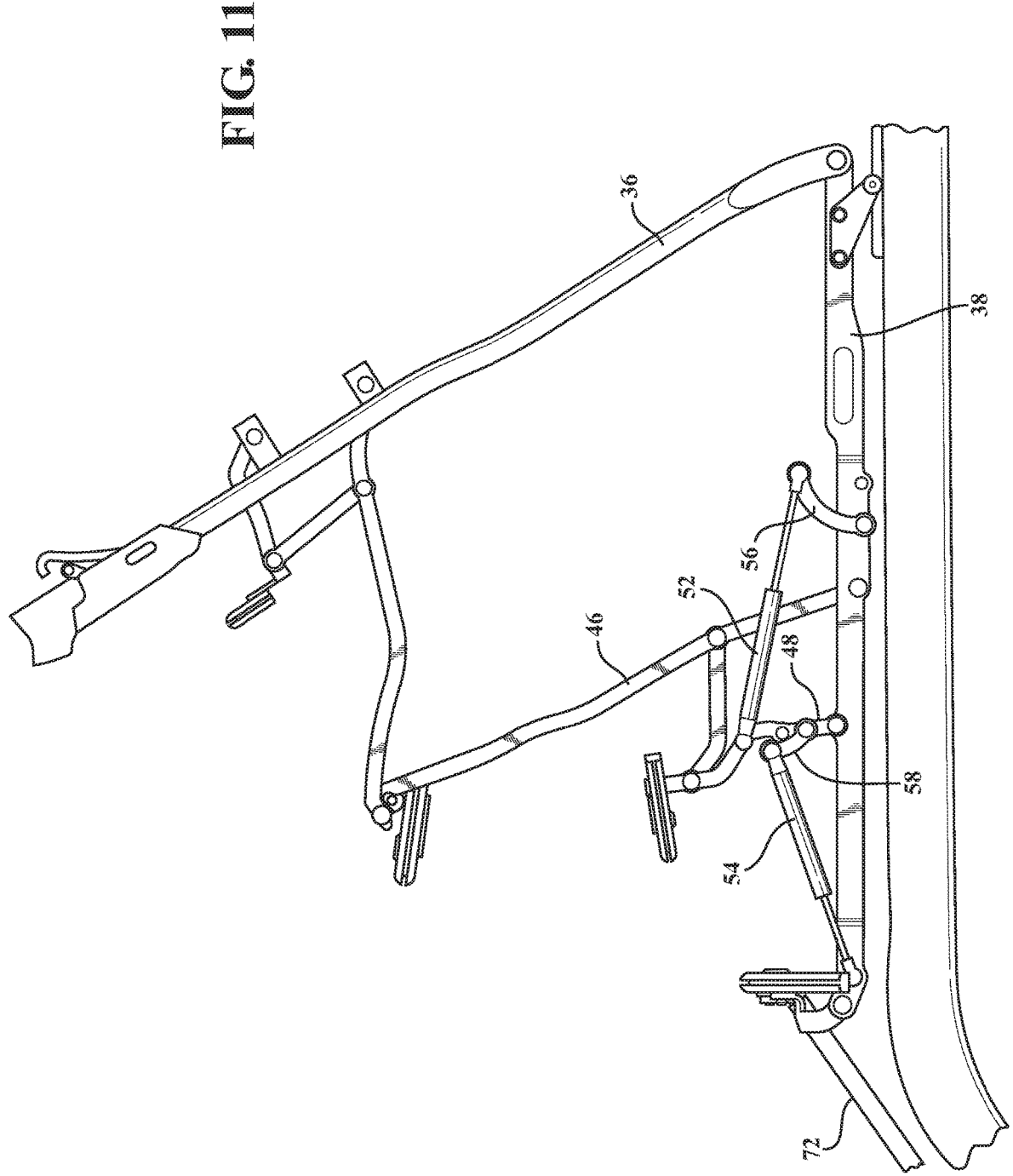
FIG. 11 is a side elevation of FIG. 10, in accordance with the present invention.

Referring more particularly to FIGS. 10-11 (and FIG. 5 equally applicable to the rearward/forward directions), in operation to move the top from the open sunroof position and the closed position, the pivotal portion 62 is lifted and rotated forward. The top cover management is controlled by the first and second intermediate bows assemblies 82,84. Continue rotating the pivotal portion until the assembly is in the closed position. Then latch to the windshield header 14.

Referring more particularly to FIGS. 10-11, as the top is being closed, second gas strut 54 cylinder unloads. In doing so, the cylinder applies its load through the top mechanism linkages thereby reducing the amount of effort required to operate the top. The first gas strut 52 cylinder remains unloaded and is free to rotate via the first gas strut idler link 56.

Referring more particularly to FIG. 5, continuing through the closing motion the first gas strut idler link 56 makes contact with a second idler stop 61 attached to the rear side rail 38. As the mechanism continues to close, this stop 61 prevents any further rotation of the idler link 56, thereby compressing the first gas strut 52. The compression of the first gas strut 52 dampens the motion of the top mechanism as it closes. The second gas strut 54 is fully unloaded at this point.

Referring more particularly to FIGS. 1 and 11, preferably, a pair of rear bow lift assist, shown generally at 70, is provided which is operably connected to the rear bow 30, e.g., by a pair of rearmost uprights rotatably connected to the lift assist 70, and the lift assists 70 are connected to the vehicle rear sport bars for rotational movement of the assembly 10, including, the rear bow 30, to the top down/open position. A pair of rear uprights 72 are also operably rotatably connected to the rear bow lift assist 70 and operably connected to the three bow 28 to set a rear upper transition height and for rotation to the assembly 10 to the top down/open position. Preferably, at least one of the rear bow lift assists 70 is a locking lift assist. A lift assist release assembly can also be provided to release the rear bow lift assist to allow rotation of the assembly 10 to the open down position.

Figure 12:
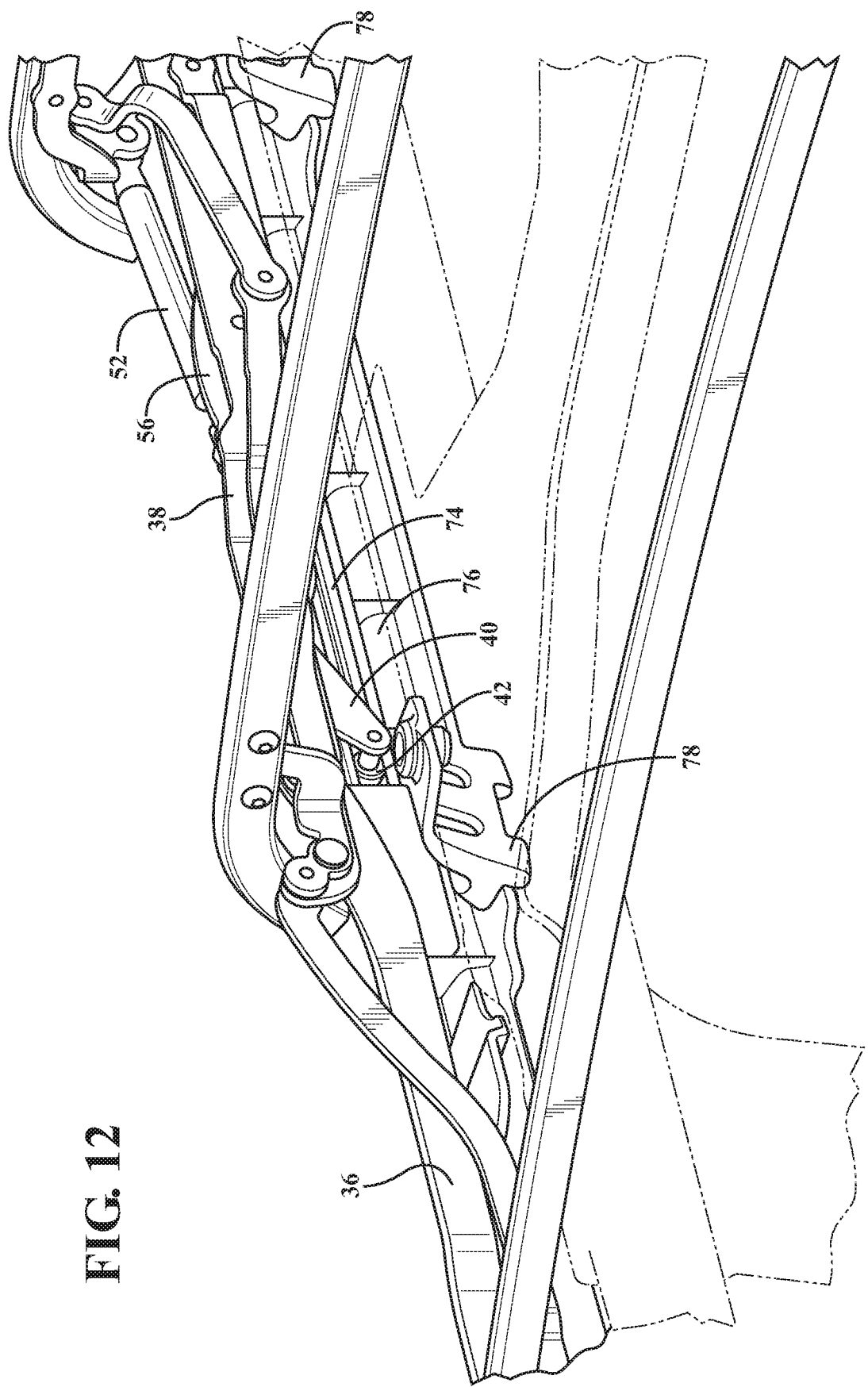
FIG. 12 is a front perspective view of a roller assembly of the soft top assembly slidably connected to a track coupled to a door side rail, in accordance with the present invention.
Figure 13:
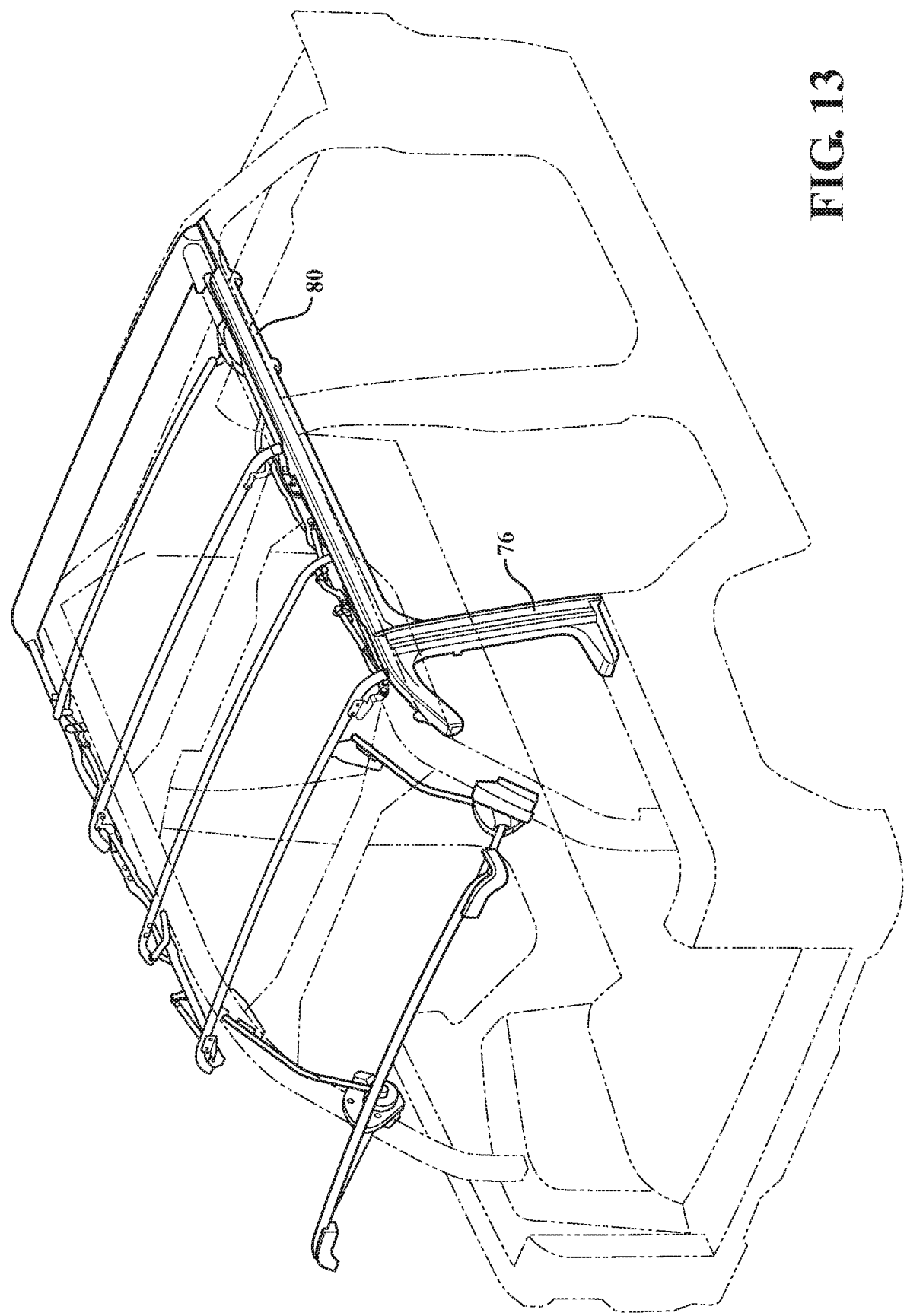
FIG. 13 is perspective view of the soft top assembly depicting a first door rail and a second door rail connected to a vehicle, in accordance with the present invention.

Referring to the figures generally, and, more particularly, to FIGS. 12-13, preferably, the soft top assembly 10 includes at least one door rail. This provides the connection to the vehicle 12 (and can additionally provide sealing, depending on the application). Preferably, a plurality of door rails are provided. Most preferably, a door rail 80 (preferably, that is a front door rail) operably connected to the vehicle, and a second side rail 76 (preferably, a rear door rail) on both sides of the vehicle 12. More or less door rails are contemplated depending on the application without departure from the scope of the present invention. Preferably, the first and second door rails 80,76 provide a water tight seal with the cover of the top assembly 10 when in the closed position. Preferably, the pair of first and second door rails 80,76 also provide a water tight seal against the vehicle doors, e.g., front doors and rear doors, respectively. The first and second door rails 80,76 are operably connected to the vehicle 12, preferably, with at least one clamp 78, most preferably, a plurality of clamps 78 on the first and second door rails 80,76, respectively, which connect to the sport bars 16,18, e.g., via mushroom knobs or other threaded fastener or fastener of any kind suitable for connecting the door rails 80,76 to the sport bars 16,18. Any other suitable attachment feature of the pivotal portion 62 to the vehicle depending on the application is contemplated without departure from the scope of the present invention, e.g., a side rail (e.g., first side rail 36) rotatably connected directly to a cross member 22, sport bar 16,18 or any other vehicle part.

Most preferably, the second door rails 76 provide a connection with the soft top mechanism, preferably, a slidably connected feature within a track 74 of the second door rails 76, right hand and left hand door rails 76 on opposing sides of the vehicle 12. Preferably, the track 74 is operably connected to the vehicle (both sides in a fore/aft direction), most preferably, operably connected to or integrally formed with the second door rails 76. At least one guide roller assembly is provided on each side of the assembly 10 with a guide roller 42 that slides in the tracks 74. The guide roller assembly includes a bracket 40 operably connected to the front or rear side rail 36,38, most preferably, to the rear guide rail 76. The bracket 40 is also operably connected to the guide roller 42. Once the pivotal portion 62 is rotated rearward to the open sunroof position, this allows the top to be slid rearward along the track 74 to allow the assembly 10 to rotate to the top open/down position.

Referring to FIGS. 1-13 generally, it is understood that the left side of the assembly 10 is a substantially mirror image to the right side. It is also understood that while a 4-door sport utility vehicle is illustrated, it is understood that the present invention is adaptable for a 2-door vehicle, 2-door sport utility vehicle, 4-door vehicle, 2 or 4-door SUV with extended cargo area, or any other kind of vehicle and etc, without departure from the scope of the present invention.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A folding soft top assembly adapted for connecting to a vehicle having a windshield frame with side members extending therefrom and a crossmember connecting the side members substantially adjacent the rear of the driver passenger compartment, said folding soft top assembly comprising:
    a pivotal portion adapted to operably connect to said side members of said vehicle, said pivotal portion selectively pivotal between a closed position and at least one open position;
    a pair of intermediate bow pivot links operably connected to a pair of side rails, respectively;
    a pair of lift assist mechanisms each comprising a first gas strut and a second gas strut operably connected to said intermediate bow pivot link and said side rail in force opposition, said lift assist mechanism including a first idler link connected to said first gas strut and to said side rail and a second idler link connected to said side rail and said second gas strut operable to assist moving said soft top assembly between said closed position and said at least one open position.

2. The folding soft top assembly of claim 1, wherein each of said intermediate bow pivot links is pivotally connected to a respective one of said pair of side rails, and wherein when said pivotal portion is opened the force in one of said gas struts applies force to said intermediate bow pivot link assisting said pivotal portion in an opening direction and said other gas strut is compressed, and upon moving said pivotal portion in a closing direction the now compressed gas strut provides force assistance for closing said soft top assembly.

3. The folding soft top assembly of claim 1, further comprising a pair of first side rails pivotally connected to said pair of side rails, wherein said pair of side rails are rear side rails.

4. The folding soft top assembly of claim 3, further comprising a header connected to said pair of first side rails, said header adapted for selectively operably connecting to said windshield frame when said folding soft top assembly is in said closed position.

5. The folding soft top assembly of claim 1, further comprising a pair of intermediate bow control links pivotally connected to a pair of door rails, each intermediate bow control link connected to an assist linkage articulatingly connected to said intermediate bow pivot link.

6. The folding soft top assembly of claim 5, wherein said intermediate bow pivot link is connected to an intermediate bow for fabric management during rotation of said pivotal portion between said closed position and an open sunroof position.

7. The folding soft top assembly of claim 1, wherein as the soft top assembly is being closed, a cylinder of said second gas strut unloads, and, the cylinder applies its load through top mechanism linkages thereby reducing the amount of effort required to operate the soft top assembly, and wherein a cylinder of the first gas strut remains unloaded and is free to rotate via a first gas strut idler link.

8. The soft top assembly of claim 1, wherein as the top is opened by lifting the first side rail, a cylinder of the first gas strut unloads and applies its load through linkages of the top mechanism, thereby reducing the amount of effort required to operate the soft top assembly, wherein a cylinder of the second gas strut remains fully unloaded as it is free to rotate via an idler link attached to a second intermediate bow pivot link.

9. The folding soft top assembly of claim 1, further comprising at least one idler stop connected to each of said pair of intermediate bow pivot links operable to contact said second gas strut when said soft top assembly moves in an opening direction to load said second gas strut.

10. The folding soft top assembly of claim 9, wherein said loading dampens the effect of top mass as said soft top assembly moves down into said open position, and, at the same time, said first gas strut is unloaded and free to rotate about a pivot joint on said first idler link.

11. The folding soft top assembly of claim 1, wherein when said soft top assembly is in said open position said first gas strut is fully unloaded/open and said second gas strut is fully loaded/compressed.

12. The folding soft top assembly of claim 1, further comprising:
a first intermediate bow assembly including a first control link connected to a first intermediate bow and a first side rail of said pivotal portion, and a second control link connected to said first intermediate bow and a pivot link that is connected to a second intermediate bow control link pivotally connected to a second side rail, wherein said first intermediate bow assembly controls top cover management as said soft top assembly moves between said closed and open positions.

13. The folding soft top assembly of claim 12, further comprising:
a second intermediate bow connected to said intermediate bow pivot link and to an assist linkage to form a second intermediate bow assembly, wherein said first and second intermediate bow assemblies provide fabric management as said soft top assembly moves to/from said closed position from/to said open position.

14. The folding soft top assembly of claim 1, further comprising at least one idler stop connected to each of said pair of side rails operable to contact said first idler link to prevent further rotation of said first idler link thereby compressing said first gas strut.

15. The folding soft top assembly of claim 14, wherein said compression of said first gas strut dampens the motion of the top mechanism as closing, and wherein said second gas strut is simultaneously fully unloaded.

16. The folding soft top assembly of claim 1, further comprising at least one door rail adapted to operably connect to said side members of said vehicle, wherein said pivotal portion is operably coupled to said at least one door rail.

17. A folding soft top assembly adapted to connect to a vehicle including a windshield frame with side members extending therefrom and a crossmember connecting the side members substantially adjacent the rear of the driver passenger compartment, said folding soft top assembly comprising:
a pair of front side rails pivotally connected to a pair of rear side rails, said pair of rear side rails adapted to operably couple to said side members of said vehicle;
a plurality of control linkages operably coupled to the front and rear side rails;
a plurality of intermediate bows operably coupled to respective control linkages, wherein the intermediate bows are fabric management bows;
a first and second gas strut operably connected to the rear side rail and respective control linkages operable to provide lift assist and controlling motion when moving between an open sunroof position and a closed position.

18. The soft top assembly of claim 17, wherein as the soft top assembly is being closed, a gas strut cylinder unloads, and, the cylinder applies its load through top mechanism linkages thereby reducing the amount of effort required to operate the soft top assembly, and wherein another gas strut cylinder remains unloaded and is free to rotate via a first gas strut idler link.

19. The soft top assembly of claim 17, wherein as the soft top assembly is opened by lifting a first side rail, a first gas strut cylinder unloads, and, applies its load through top mechanism linkages, thereby reducing the amount of effort required to operate the top, wherein a second gas strut cylinder remains fully unloaded as it is free to rotate via an idler link attached to an intermediate bow pivot link.

20. A folding soft top assembly adapted for connecting to a vehicle, comprising:
a pivotal portion operably adapted to connect at a roof top opening of said vehicle, said pivotal portion selectively pivotal in an opening direction and a closing direction between a closed position and at least one open position;
a pair of intermediate bow pivot links operably connected to a pair of side rails;
a pair of first idler links connected to said pair of side rails;
a pair of second idler links connected to said pair intermediate bow pivot links;
a pair of lift assist mechanisms each comprising a first gas strut connected to said first idler link and a second gas strut connected to said second idler links in force opposition;
a first stop connected to each of said second idler links; and
a second stop connected to each of said first idler links;
wherein as said pivotal portion rotates in said opening direction said second idler link and said first stop come into contact to load said second gas strut and said first gas strut unloads, and wherein as said pivotal portion rotates in said closing direction said first idler link and second stop come into contact to load said first gas strut and said second gas strut unloads.

\* \* \* \* \*